US011182689B2

(12) United States Patent
Dube et al.

(10) Patent No.: US 11,182,689 B2
(45) Date of Patent: Nov. 23, 2021

(54) ADAPTIVE LEARNING RATE SCHEDULE IN DISTRIBUTED STOCHASTIC GRADIENT DESCENT

(71) Applicant: INTERNATIONAL BUSINESS MACHINES CORPORATION, Armonk, NY (US)

(72) Inventors: Parijat Dube, Yorktown Heights, NY (US); Sanghamitra Dutta, Yorktown Heights, NY (US); Gauri Joshi, Yorktown Heights, NY (US); Priya A. Nagpurkar, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 911 days.

(21) Appl. No.: 15/938,830

(22) Filed: Mar. 28, 2018

(65) Prior Publication Data

US 2019/0303787 A1 Oct. 3, 2019

(51) Int. Cl.
*G06N 99/00* (2019.01)
*G06N 3/08* (2006.01)
*G06F 11/34* (2006.01)
*G06N 5/04* (2006.01)
*G06N 7/08* (2006.01)
*G06K 9/62* (2006.01)
*G06F 9/50* (2006.01)
*G06N 20/00* (2019.01)

(52) U.S. Cl.
CPC ............. *G06N 7/08* (2013.01); *G06F 9/5038* (2013.01); *G06K 9/6217* (2013.01); *G06N 20/00* (2019.01)

(58) Field of Classification Search
CPC ........ G06N 7/08; G06N 20/00; G06K 9/6217; G06K 9/6268; G06K 9/6227; G06F 9/5038
USPC ................................................ 706/1–61; 1/1
See application file for complete search history.

(56) References Cited

U.S. PATENT DOCUMENTS

| 9,613,316 B2 | 4/2017 | Harik |
| 9,652,288 B2 | 5/2017 | Jain et al. |
| 2014/0081895 A1* | 3/2014 | Coenen .................... G06N 3/08 706/25 |

(Continued)

OTHER PUBLICATIONS

Martin A. Zinkevich, et al., "Parallelized Stochastic Gradient Descent," Advances in Neural Information Processing Systems, 2010, pp. 1-9.

(Continued)

*Primary Examiner* — Brandon S Cole
(74) *Attorney, Agent, or Firm* — F. Chau & Associates, LLC

(57) ABSTRACT

A method for performing machine learning includes assigning processing jobs to a plurality of model learners, using a central parameter server. The processing jobs includes solving gradients based on a current set of parameters. As the results from the processing job are returned, the set of parameters is iterated. A degree of staleness of the solving of the second gradient is determined based on a difference between the set of parameters when the jobs are assigned and the set of parameters when the jobs are returned. The learning rates used to iterate the parameters based on the solved gradients are proportional to the determined degrees of staleness.

19 Claims, 4 Drawing Sheets

(56) References Cited

U.S. PATENT DOCUMENTS

| | | | | |
|---|---|---|---|---|
| 2015/0379072 A1* | 12/2015 | Dirac | ............... | G06N 20/00 |
| | | | | 707/693 |
| 2015/0379426 A1* | 12/2015 | Steele | ............... | G06N 20/00 |
| | | | | 706/12 |
| 2016/0371601 A1 | 12/2016 | Grove et al. | | |
| 2016/0379111 A1 | 12/2016 | Bittner, Jr. et al. | | |
| 2018/0144245 A1* | 5/2018 | Simard | ............... | G06N 3/084 |
| 2018/0165603 A1* | 6/2018 | Van Seijen | ............... | G06N 5/043 |
| 2019/0042763 A1* | 2/2019 | Zhao | ............... | G06F 21/60 |
| 2019/0258964 A1* | 8/2019 | Dube | ............... | G06N 20/00 |
| 2019/0303787 A1* | 10/2019 | Dube | ............... | G06K 9/6227 |
| 2019/0354850 A1* | 11/2019 | Watson | ............... | G06N 3/08 |
| 2020/0120000 A1* | 4/2020 | Parthasarathy | ............... | G06F 11/3428 |

OTHER PUBLICATIONS

Feng Niu, et al., "Hogwild!: A Lock-Free Approach To Parallelizing Stochastic Gradient Descent," in NIPS, 2011, pp. 1-9.

John Langford, et al., "Slow Learners Are Fast," Advances in Neural Information Processing Systems 22 (NIPS 2009), pp. 1-9.

Rie Johnson, et al., "Accelerating Stochastic Gradient Descent Using Predictive Variance Reduction," Advances in Neural Information Processing Systems 26 (NIPS 2013), pp. 1-9.

Qirong Ho, et al., "More Effective Distributed ML Via A Stale Synchronous Parallel Parameter Server," Advances in Neural Information Processing Systems 26 (NIPS 2013), pp. 1-9.

\* cited by examiner

ADAPTIVE LEARNING RATE SCHEDULE IN DISTRIBUTED STOCHASTIC GRADIENT DESCENT

BACKGROUND

The present invention relates to distributed stochastic gradient descent (SGD) and, more specifically, to adaptive learning rate schedule in distributed SGD Stochastic gradient descent (SGD) is an approach for minimizing an objective function. SGD may be used in machine learning to iterate objective functions so as to minimize error and thereby increase correctness in built models. Traditionally, SGD has been performed using a single processor working on training data in series. However, as training data can be massive, waiting for a single processor can be prohibitively slow.

SUMMARY

A method for performing machine learning includes assigning a first processing job to a first model learner, using a central parameter server. The first processing job includes solving a first gradient based on a set of parameters of a first state. A second processing job is assigned to a second model learner, using the central parameter server. The second processing job includes solving a second gradient based on the set of parameters of the first state. The first processing job is performed in the first model learner. The set of parameters is iterated from the first state to a second state based on the results of the performing of the first processing job. The second processing job is performed in the second model learner. The set of parameters is iterated from the first state to a third state based on the results of the performing of the first processing job. A degree of staleness of the solving of the second gradient is determined based on a difference between the set of parameters of the first state and the set of parameters of the third state. The set of parameters is iterated from the second state to a fourth state based on the results of the performing of the second processing job and a learning rate that is proportional to the determined degree of staleness.

A system for performing machine learners includes a central parameter server configured to asynchronously assign processing jobs and manage a set of parameters. A plurality of model learners is in communication with the central parameter server and is configured to receive the assigned processing jobs and the set of parameters and to solve a gradient therefrom. The central parameter server is further configured to set a learning rate for each of the assigned processing jobs that is inversely proportional to a corresponding degree of staleness.

A computer program product for performing stochastic gradient descent includes a computer readable storage medium having program instructions embodied therewith. The program instructions are executable by a computer to cause the computer to assign a first processing job to a first model learner, by the computer. The first processing job includes solving a first gradient based on a set of parameters of a first state. A second processing job is assigned to a second model learner, by the computer. The second processing job includes solving a second gradient based on the set of parameters of the first state. The first processing job is performed in the first model learner. The set of parameters is iterated from the first state to a second state, by the computer, based on the results of the performing of the first processing job. The second processing job is performed in the second model learner. The set of parameters is iterated from the first state to a third state, by the computer, based on the results of the performing of the first processing job. A degree of staleness of the solving of the second gradient is determined, by the computer, based on a difference between the set of parameters of the first state and the set of parameters of the third state. The set of parameters is iterated from the second state to a fourth state, by the computer, based on the results of the performing of the second processing job and a learning rate that is proportional to the determined degree of staleness.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

Figure 1:
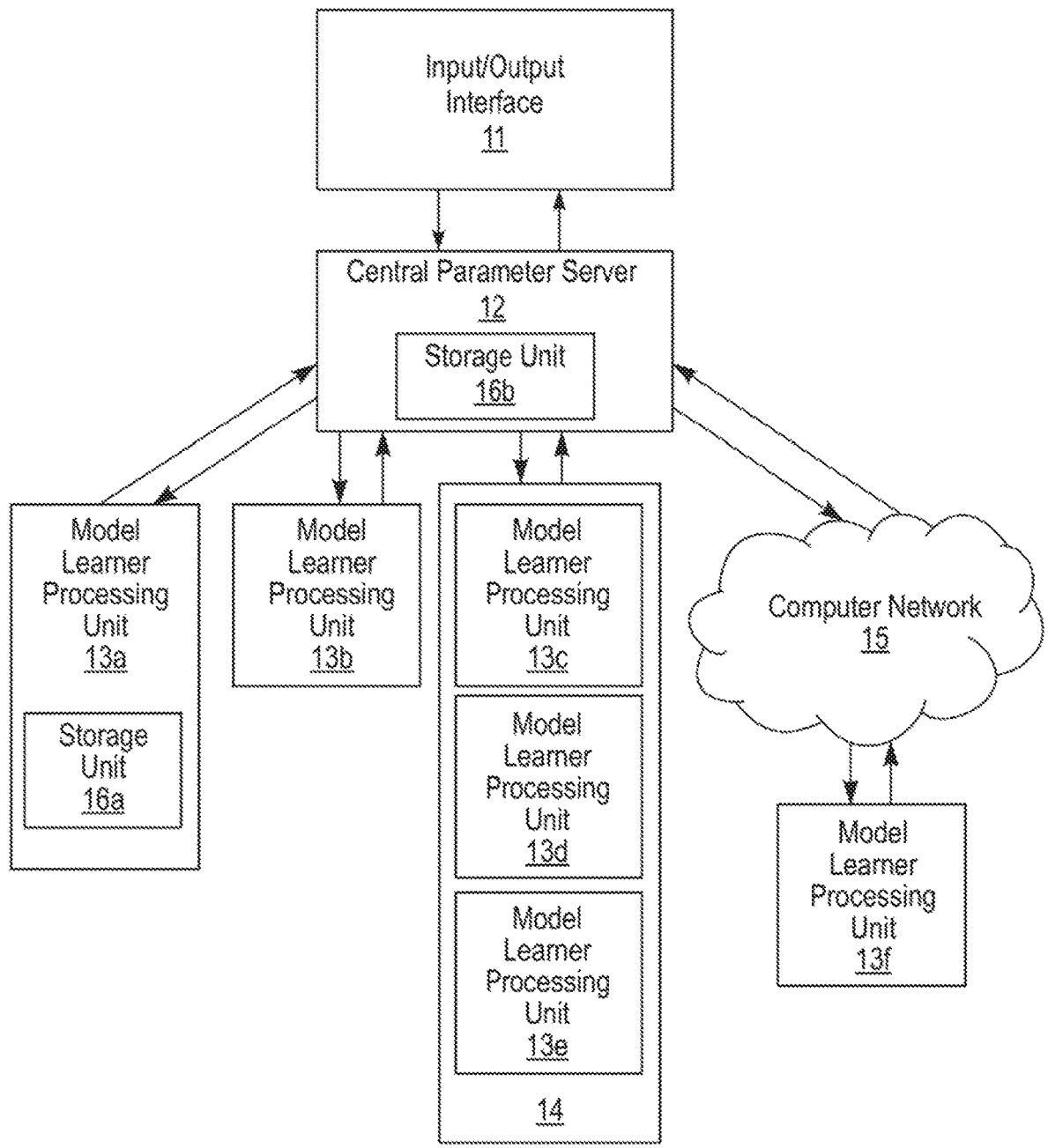
FIG. 1 is a schematic diagram illustrating an apparatus for performing distributed stochastic gradient descent in accordance with exemplary embodiments of the present invention.

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

Exemplary embodiments of the present invention may utilize a distributed approach to performing stochastic gradient descent (SGD) in which a central parameter server (PS) is used to manage SGD as a plurality of learner machines process gradients in parallel. The parameter server updates model parameters based on the results of the processed gradients and then the learner machines may use the updated model parameters in processing subsequent gradients. In this sense, stochastic gradient descent is performed in a distributed manner, and so this process may be called distributed stochastic gradient descent.

In performing distributed SGD, learner machines may either be configured to operate in synchronous or asynchronously. When operating in synchronous, training data may still be processed in series, with one learner machine awaiting the results of another. This approach may be slow, particularly for expansive data sets. Asynchronous operation may greatly speed up the process, as a very large number of learner machines may each process gradients independently, without having to wait for each other's output. When operating asynchronously, however, a problem may arise in that by the time one learner machine solves a gradient, the gradient may be stale. A stale gradient is one that is based on a set of parameters that is out of date. Parameters may evolve in response to the solving of gradients performed by the learner machines, and so, when one learner machine returns a solution to a gradient that is based on out of date parameters, it is said that the solved gradient is stale. While exemplary embodiments of the present invention may reject stale gradients, highly parallelized model learning is likely to result in a very high number of stale gradients and rejecting all stale gradients may be inefficient.

Accordingly, exemplary embodiments of the present invention may assess a level of staleness of each gradient as it is returned and then make use of each gradient with a weighting that reduces the impact of each gradient in accordance with its degree of staleness. Accordingly, more stale gradients may have less of an impact on parameter updating while less stale gradients may have more of an impact on parameter updating.

However, exemplary embodiments of the present invention need not apply a binary weight in which stale gradients do not contribute at all to parameter updates and non-stale gradients are given full weight, rather, a sliding scale may be applied such that stale gradients are still used to contribute to the updating of the gradients, just with less weight than less stale gradients.

FIG. 1 is a schematic diagram illustrating an apparatus for performing distributed stochastic gradient descent in accordance with exemplary embodiments of the present invention. An input/output interface 11 may be used to interact with a ventral parameter server. The central parameter server 12 may be a machine tasked with managing machine learning and updating parameters. The central parameter server may thereby send gradients to each of a plurality of model learners 13a-13f (collectively referred to herein as "13").

The input/output interface 11 may be a machine that tasks the central parameter server 12 with a particular computer learning job and later retrieves the results of the computer learning job from the central parameter server 12.

The model learners 13 may process gradients in parallel and pass results back to the central parameter server 12, which may update the parameters based on the processed gradients, weighted according to a measure of staleness.

The model learners may be instantiated as independent machines such as is shown in 13a, 13b, and 13f. These independent machines may be in direct communication with the central parameter server 12, such as is shown in 13a and 13b, or may be in communication with the central parameter server 12 via a computer network 15 such as the Internet, such as is shown in 13f. Each model learner may alternatively be an instance of a virtual machine running on a server 14 that hosts multiple virtual machines, such as is shown in 13c, 13d, and 13e.

In determining a measure of staleness, current parameters may be compared to the parameters used by the model learner in computing the gradient. Thus, the set of parameters handed to each model learner may be stored so that this comparison may be made after the gradient has been computer. The central parameter server 12 may be configured to store the parameters as they were when the gradient was sent to the model learner, for example, within a storage unit 16b. Alternatively, these parameters may be stored within the model learner 13a, for example, within a storage unit 16a, so that they may be passed back to the central parameter server 12 along with the gradient results after the gradient has been computed by the model learner 13. In either approach, the most recent parameters are stored within the central parameter server 12, for example, within the storage unit 16b. The storage units 16a and 16b may be instantiated as flash memory devices, an on-chip cache, or the like.

Figure 2:
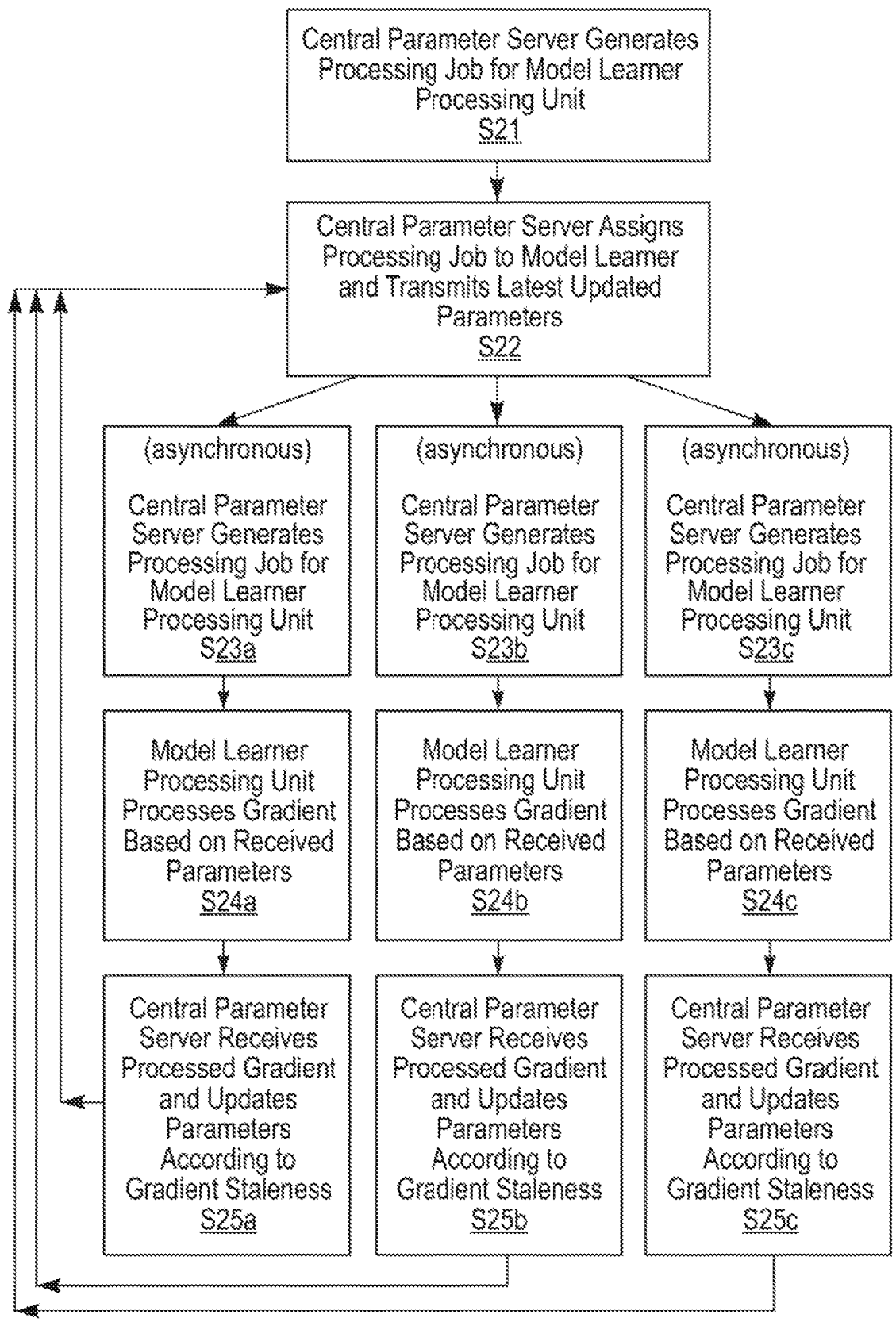
FIG. 2 is a flowchart illustrating an approach for performing distributed SGD in accordance with exemplary embodiments of the present invention.

FIG. 2 is a flowchart illustrating an approach for performing distributed SGD in accordance with exemplary embodiments of the present invention. First, the central parameter server may generate parallel processing jobs for a plurality of model learners (Step S21). These processing jobs may include the processing of gradients as part of distributed SGD. Next, the central parameter server may assign the generated processing jobs to various model learners and as the central parameter server assigns these jobs to each model learner, the central parameter server may also pass a most recent set of parameters to the model learner (Step S22). As discussed above, the state of the parameter server at the time of job assignment may be stored for later use in assessing staleness either by the central processing server or the model learner.

As there may be a plurality of model learners each processing gradients in parallel, the central processing server may generate processing jobs for each of the available model learner processing units (Step S23a, Step S23b, and Step S23c, collectively referred to herein as "Step S23"). These processing jobs may be generated asynchronously, which is to say, the jobs may be assigned independently without waiting for one job to be completed as a prerequisite for another job being assigned.

As discussed above, as the model learner processing units may be instantiated as virtual machines, containers, or the like, running on remote servers, the model learners may be implemented as a cloud computing service such as MICROSOFT AZURE developed by Microsoft Corporation, AMAZON WEB SERVICES (AWS) developed by Amazon.com, Inc., or GOOGLE CLOUD PLATFORM, developed by Google LLC.

Upon receiving its job assignment, each model learner may process its gradient based on the set of parameters that it received from the central processing server (Step S24a, Step S24b, and Step S24c, collectively referred to herein as "Step S24").

After completing its respective assigned job, each model learner may then transmit its processed gradient back to the central processing server and the central processing server may receive these processed gradients, asynchronously (e.g. as they are received), may calculate gradient staleness by comparing the parameters used by the model learner to compute the gradient (either stored within the model learner or the central processing server, as described above), and may update parameters based on the computed gradient in a manner that is inversely proportional to the measured parameter staleness (Step S25a, Step S25b, and Step S25c, collectively referred to herein as "Step S25").

The central processing server may all-the-while continue to assign processing jobs to model learners as they become available (Step S22). When all jobs are processed, for example, all training data has been analyzed, the objective function may be considered to be minimized and the objective function may thereafter be used in performing its designated task. For example, the objective function may be used to interpret voice commands and machine learning may be used to minimize error in the objective function so that voice commands may be more accurately interpreted.

However, minimizing the objective function may continue to be performed indefinitely, even as it is used to perform its designated task. In this regard, the objective function may continue to be refined, even while it is in use.

As described above, exemplary embodiments of the present invention may perform asynchronous distributed SGD without rejecting stale gradients, which would tend to be slow and inefficient, and without treating all gradients with equal weight, which would lead to less effective computer learning. Exemplary embodiments of the present invention may utilize all gradients effectively by weighing the gradients according to staleness. In this way, the present approach may have improved speed, improved efficiency, and improved efficacy.

Figure 3:
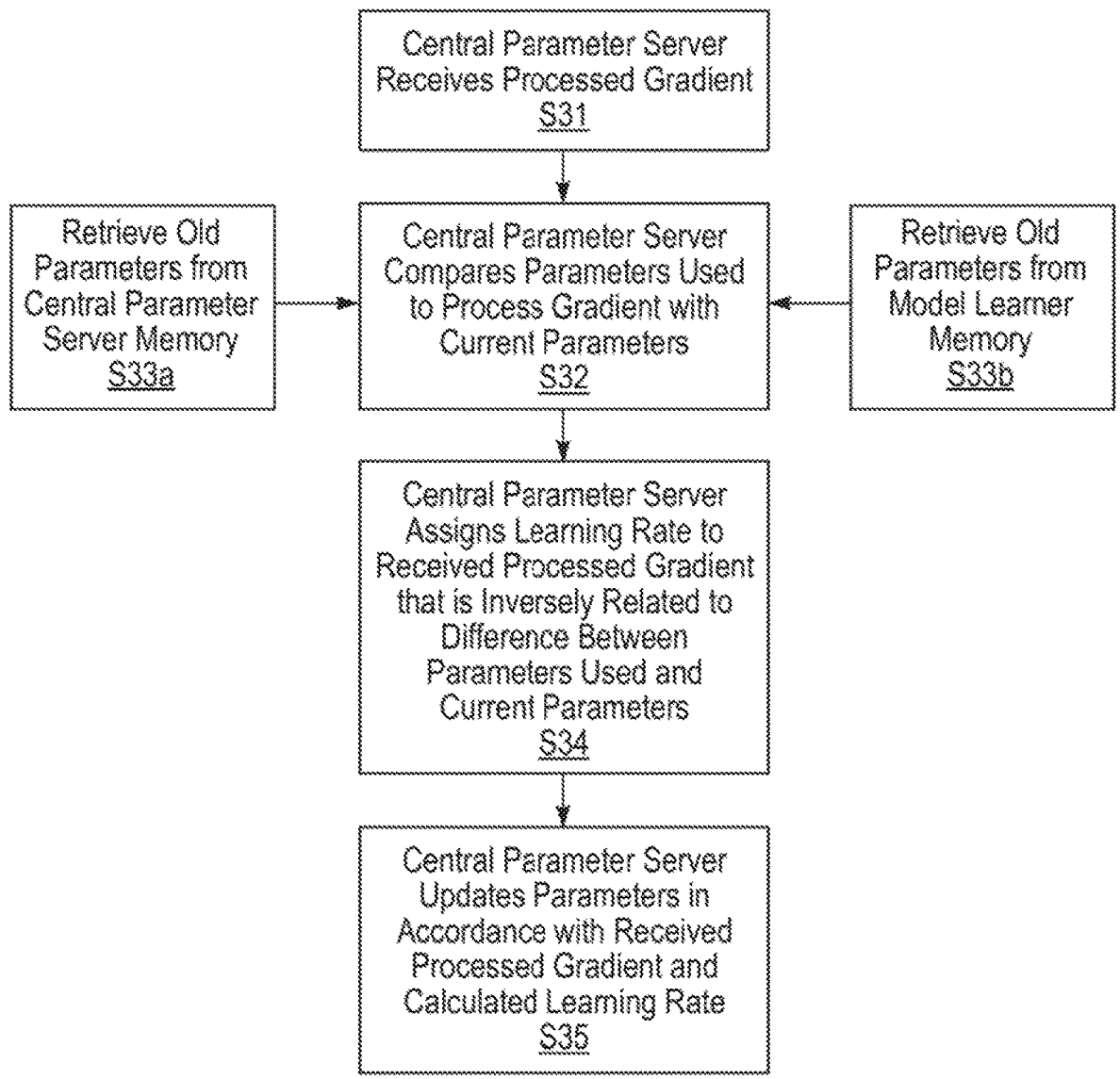
FIG. 3 is a flowchart illustrating an approach for updating objective function parameters according to gradient staleness in accordance with exemplary embodiments of the present invention.

FIG. 3 is a flowchart illustrating an approach for updating objective function parameters according to gradient staleness in accordance with exemplary embodiments of the present invention. After the model learners have processed the gradient job assigned thereto (Step S24 of FIG. 2), the central parameter server receives the processed gradient from the model learner (Step S31). The central parameter server then compares the parameters used by the model learner to process the gradient with the most recently updated parameters (Step S32). While the central parameter server may know the most recently updated parameters, having calculated them itself, the central parameter server can look up the parameters used by the model learner in one of two ways: the parameters used by the model server may be retrieved from a memory of the central parameter server (Step S33a), which may store such parameters at the time of job assignment or the parameters used by the model server may be retrieved from a memory of the model learner (Step S33b). In either event, the result of the comparison of Step S32 may be to determine an extent to which the parameters used by the model server are out of date (e.g. staleness).

The parameters may be expressed as the parameter vector w, where the parameter vector at a given time t is expressed as $w_t$. Thus, $w_{\tau(t)}$ (represents the parameter vector iterated with respect to time. The objective function F is expressed as a function of the parameters, e.g. F(w), or as $F(w_{\tau(t)})$, which represents the iterated objective function. The step size (learning rate) may be expressed as $\eta$, or as $\eta_t$ with respect to a particular time.

Thus, exemplary embodiments of the present invention may compute the updated parameters by solving for the equation:

$$w_{t+1} = w_t - \eta_t \nabla F(w_{\tau(t)})$$

where the most recent parameter vector is expressed as $w_{t+1}$ (indicating the value of the parameter vector as a result of the computed gradient) and it is defined as the original parameter vector given to the model learner at job assignment $w_t$ (the stale parameter) minus the step size with respect to time multiplied by the gradient of the objective function calculated by the model learner for the iterated parameter vector at the original time.

In this way, the parameter vectors are updated according to the computed gradient.

Moreover, the learning rate $\eta$ is dependent upon the iteration, which may be expressed in terms of the time (e.g. $\eta_t$) or in terms of the jth iteration (e.g. $\eta_j$), which is to say, the learning rate is particular to the computed gradient. As the learning rate may be computed so as to be inversely related to the extent to which parameter vectors have changed, for example, the following equation may be used:

$$\eta_j = \min\left\{\frac{C}{\|w_j - w_\tau\|_2^2}, \eta_{max}\right\}.$$

here C is a predetermined constant and $\tau(j) \leq j$.

Accordingly, the learning rate is inversely proportional to the true staleness, which is defined as the squared norm of the difference of the stale parameter and the current parameter.

Thus, according to exemplary embodiments of the present invention, the central parameter server may calculate the learning rate $\eta_t$ or $\eta_j$, for example as described above, (Step S34) and then the central parameter server calculated the updated parameters $w_{t+1}$ according to the processed gradient $\nabla F$ and the calculated learning rate, for example as described above (Step S35).

Figure 4:
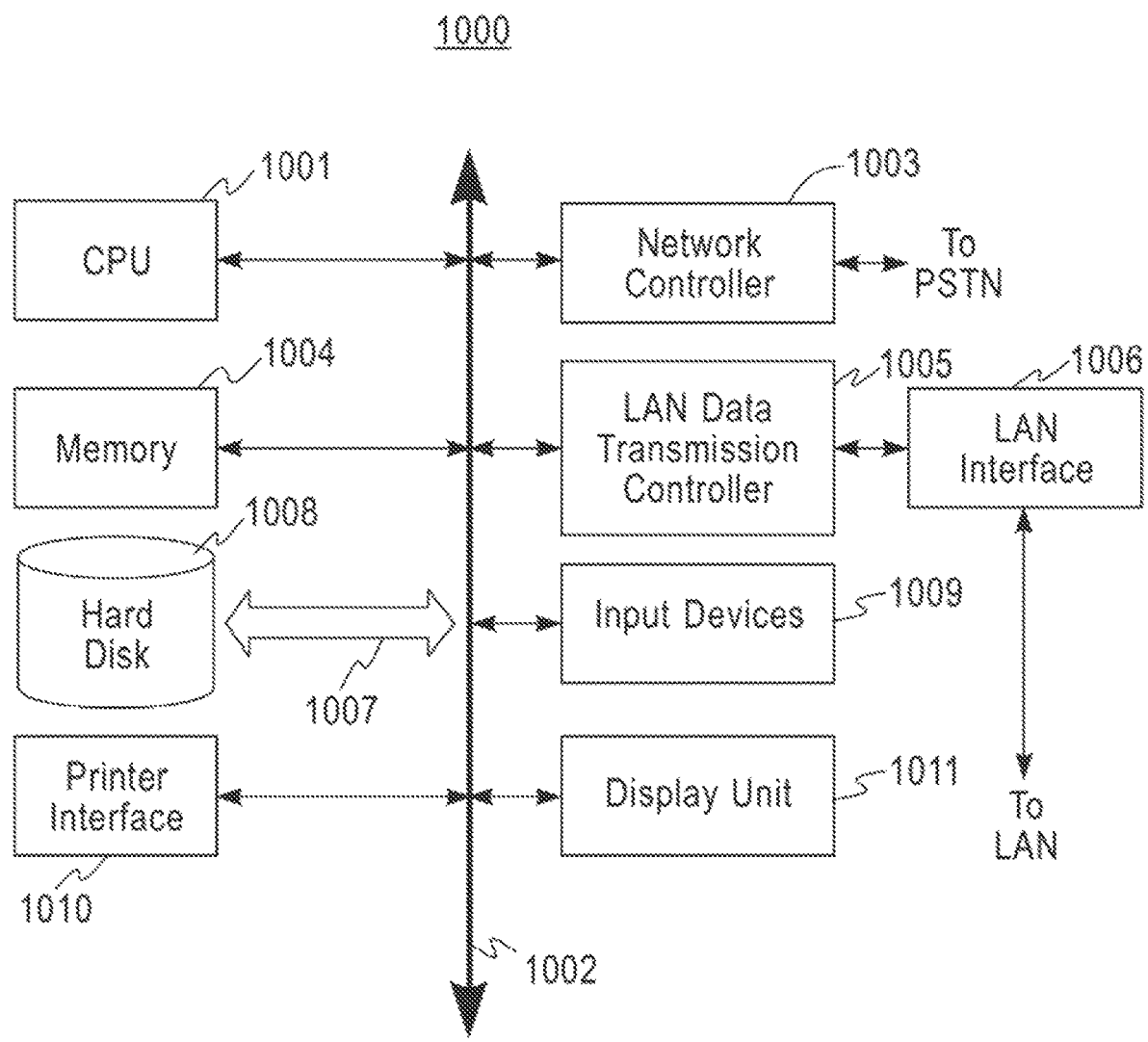
FIG. 4 shows an example of a computer system capable of implementing the method and apparatus according to embodiments of the present disclosure.

FIG. 4 shows another example of a system in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer-devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 4, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to FIGS. 2 and 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:
1. A method for performing machine learning, comprising:
   assigning a first processing job to a first model learner, using a central parameter server, wherein the first processing job includes solving a first gradient based on a set of parameters of a first state;
   assigning a second processing job to a second model learner, using the central parameter server, wherein the second processing job includes solving a second gradient based on the set of parameters of the first state;
   performing the first processing job in the first model learner;
   iterating the set of parameters from the first state to a second state based on the results of the performing of the first processing job;
   performing the second processing job in the second model learner;
   iterating the set of parameters from the first state to a third state based on the results of the performing of the first processing job;

determining a degree of staleness of the solving of the second gradient based on a difference between the set of parameters of the first state and the set of parameters of the third state; and iterating the set of parameters from the second state to a fourth state based on the results of the performing of the second processing job and a learning rate that is proportional to the determined degree of staleness.

2. The method of claim 1, further comprising:

assigning a third processing job to a third model learner, using the central parameter server, wherein the third processing job includes solving a third gradient based on the set of parameters of a present state for the instant at which the third processing job is assigned;

performing the third processing job in the third model learner;

determining a subsequent degree of staleness of the solving of the third gradient based on a difference between the set of parameters of the present state for the instant at which the third processing job was assigned and the set of parameters of a present state for the instant at which the third processing job was completed; and iterating the set of parameters from the present state for the instant at which the third processing job was completed to a subsequent state based on the results of the performing of the third processing job and a learning rate that is proportional to the determined subsequent degree of staleness.

3. The method of claim 2, wherein the first model learner, the second model learner, and the third model learner are all different from each other.

4. The method of claim 2, wherein the first model learner is different from the second model learner and the third model learner is the same as either the first model learner or the second model learner.

5. The method of claim 1, wherein the first model learner is different from the second model learner.

6. The method of claim 1, wherein the central parameter server assigns the first and second processing jobs asynchronously.

7. The method of claim 1, wherein the central parameter server locally stores the set of parameters of the first state.

8. The method of claim 1, wherein the first model learner locally stores the set of parameters of the first state.

9. The method of claim 1, wherein the first model learner is a computer.

10. The method of claim 1, wherein the first model learner is a virtual machine hosted on a computer.

11. The method of claim 1, wherein the first model learner is in communication with the central parameter server over the Internet.

12. A system for performing machine learning, comprising:

a central parameter server configured to asynchronously assign a first processing job to a first model learner, the first processing job including solving a first gradient based on a set of parameters of a first state, and assign a second processing job to a second model learner, the second processing job including solving a second gradient based on the set of parameters of the first state; and the first model learner configured to perform the first processing job and iterating the set of parameters from the first state to a second state based on the results of the performing of the first processing job;

the second model learner configured to perform the second processing job and iterate the set of parameters from the first state to a third state based on the results of the performing of the first processing job;

wherein the central parameter server is further configured to determine a degree of staleness of the solving of the second gradient based on a difference between the set of parameters of the first state and the set of parameters of the third state, and iterate the set of parameters from the second state to a fourth state based on the results of the performing of the second processing job and a learning rate that is proportional to the determined degree of staleness.

13. The system of claim 12, wherein the central parameter server includes a memory module for storing the state of the set of parameters when each processing job is assigned.

14. The system of claim 12, wherein each of the first and second model learners includes a memory module for storing the state of the set of parameters when each processing job is assigned.

15. The system of claim 12, wherein each of the first and second model learners is a separate computer.

16. The system of claim 12, wherein each of the first and second model learners is a virtual machine hosted on a computer.

17. The system of claim 16, wherein the computer is in communication with the central parameter server over the Internet.

18. A computer program product for performing stochastic gradient descent, the computer program product comprising a computer readable storage medium having program instructions embodied therewith, the program instructions executable by a computer to cause the computer to:

assign a first processing job to a first model learner, by the computer, wherein the first processing job includes solving a first gradient based on a set of parameters of a first state;

assign a second processing job to a second model learner, by the computer, wherein the second processing job includes solving a second gradient based on the set of parameters of the first state;

perform the first processing job in the first model learner;

iterate the set of parameters from the first state to a second state, by the computer, based on the results of the performing of the first processing job;

perform the second processing job in the second model learner;

iterate the set of parameters from the first state to a third state, by the computer, based on the results of the performing of the first processing job;

determine a degree of staleness of the solving of the second gradient based, by the computer, on a difference between the set of parameters of the first state and the set of parameters of the third state; and iterate the set of parameters from the second state to a fourth state, by the computer, based on the results of the performing of the second processing job and a learning rate that is proportional to the determined degree of staleness.

19. The computer program product of claim 18, wherein the computer is a central parameter server.

* * * * *